United States Patent
Kingsbury et al.

(10) Patent No.: US 9,628,948 B2
(45) Date of Patent: Apr. 18, 2017

(54) DETERMINING THE NECESSITY OF DEVICE TRACKING

(71) Applicant: Lenovo (Singapore) Pte. Ltd., Singapore (SG)

(72) Inventors: Timothy Winthrop Kingsbury, Cary, NC (US); Rod D. Waltermann, Rougemont, NC (US); Antoine Roland Raux, Cupertino, CA (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/744,430

(22) Filed: Jun. 19, 2015

(65) Prior Publication Data

US 2016/0373888 A1    Dec. 22, 2016

(51) Int. Cl.
*H04W 4/02*     (2009.01)
*H04W 24/08*    (2009.01)

(52) U.S. Cl.
CPC ............ *H04W 4/02* (2013.01); *H04W 24/08* (2013.01)

(58) Field of Classification Search
CPC ...................................... H04W 4/02
USPC ...................................... 455/456.1
See application file for complete search history.

(56) References Cited

U.S. PATENT DOCUMENTS

| | | | |
|---|---|---|---|
| 8,229,458 B2 * | 7/2012 | Busch | H04W 4/02 370/338 |
| 2004/0185822 A1 * | 9/2004 | Tealdi | H04W 60/00 455/404.1 |
| 2008/0055154 A1 * | 3/2008 | Martucci | G01S 5/0027 342/357.55 |
| 2016/0006576 A1 * | 1/2016 | Matsuzaki | G06F 13/00 709/224 |
| 2016/0044625 A1 * | 2/2016 | Anesi | H04W 12/04 455/411 |

* cited by examiner

*Primary Examiner* — Michael Neff
(74) *Attorney, Agent, or Firm* — Ference & Associates LLC

(57) ABSTRACT

One embodiment provides a method, including: obtaining, at a device, at least one characteristic of a detectable wireless signal; comparing, using a processor, at least one characteristic to a previously obtained wireless signal characteristic; responsive to the at least one characteristic being different than a previously obtained wireless signal characteristic, providing a notification requesting a user to enable location tracking; and responsive to the at least one characteristic not being different to a previously obtained wireless characteristic, omitting the notification. Other aspects are described and claimed.

20 Claims, 3 Drawing Sheets

US 9,628,948 B2

DETERMINING THE NECESSITY OF DEVICE TRACKING

BACKGROUND

The average individual likely utilizes multiple mobile technology applications daily. Some of those applications may be tools to help the user in various ways (e.g., communicating, information gathering, directional navigation, etc.). As applications have become more complicated and advanced with regard to their features, they have gained the ability to process more and more information to further enhance their abilities.

One source of information required for many applications is device location, and by extension the user's location. This allows certain applications to function more efficiently (e.g., if a user is searching for a restaurant, the device application can narrow the recommendations based on the user's location). There are a variety of ways to retrieve a user's location information, (e.g., GPS, Glonass, Galileo, multilateration of radio signals between cellular towers, Wi-Fi connections, etc.). However, some of these methods can be intrusive or can require a user's permission before activation. This permission, however, may not be necessary if the user's device is stationary.

BRIEF SUMMARY

In summary, one aspect provides a method, comprising: obtaining, at a device, at least one characteristic of a detectable wireless signal; comparing, using a processor, at least one characteristic to a previously obtained wireless signal characteristic; responsive to the at least one characteristic being different than a previously obtained wireless signal characteristic, providing a notification requesting a user to enable location tracking; and responsive to the at least one characteristic not being different to a previously obtained wireless characteristic, omitting the notification.

Another aspect provides an information handling device, comprising: a processor; a memory device that stores instructions executable by the processor to: obtain at least one characteristic of a detectable wireless signal; compare at least one characteristic to a previously obtained wireless signal characteristic; provide, responsive to the at least one characteristic being different than a previously obtained wireless signal characteristic, a notification requesting a user to enable location tracking, and omit, responsive to the at least one characteristic not being different to a previously obtained wireless characteristic, the notification.

A further aspect provides a product, comprising: a storage device having code stored therewith, the code being executable by a processor and comprising: code that obtains at least one characteristic of an available wireless signal; code that compares at least one characteristic to a previously obtained wireless signal characteristic; code that provides, responsive to the at least one characteristic being different than a previously obtained wireless signal characteristic, a notification requesting a user to enable location tracking; and omits, responsive to the at least one characteristic not being different to a previously obtained wireless characteristic, the notification.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
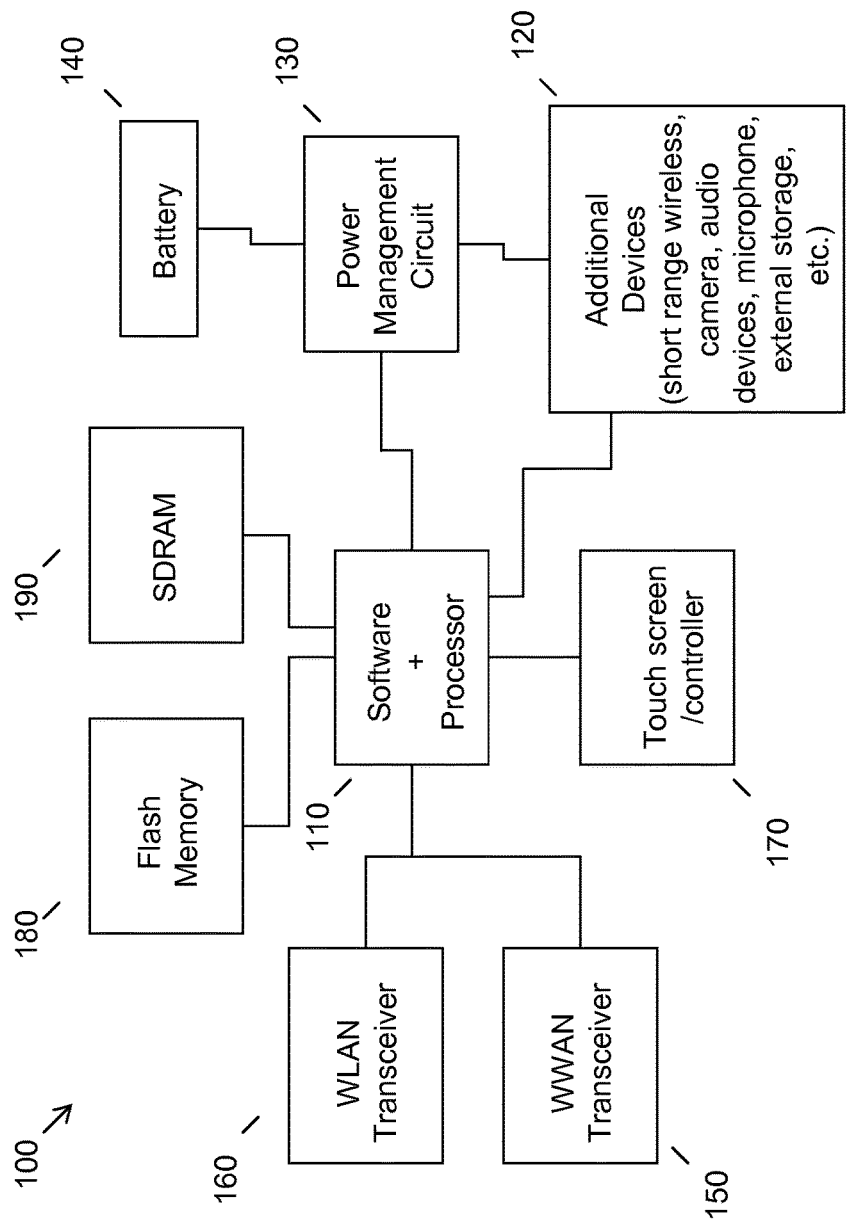
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As discussed above, many applications and web services may benefit from knowing the device's location. However, not all devices intended to be mobile are actually transported to different locations. Thus, when an information handling device is registered with a cloud-based contextual computing service, it can difficult to recognize if the laptop is likely to be moved to more than one location. In particular, many laptops may end up staying at one location (e.g., the user's house).

In the case where an information handling device (e.g., laptop, tablet, etc.) is frequently moved form one location to another (e.g., from home to work or school), it may be beneficial to the user or user applications to provide location-based contextual services via detailed location tracking (e.g., GPS tracking). This can create a challenge in determining when location services would be beneficial to the user and thus when to recommend them. The ideal solution would be to only offer the location based services to users that move their device on a regular basis. If a device is rarely or never moved to varying locations, the benefits of location services would be greatly diminished to the user and thus should not be recommended.

Current implementations only offer two possible solutions. The first is to always recommend location-based services, which can become annoying and overly burdensome to the user. The constant notification annoyance may lead the user to disable the location based services all together, which could have unintended negative consequences on their device capabilities at a later time. The second current solution is to track a user's location at all times. This solution could potentially violate the user's privacy. Additionally, this approach is likely to trigger security warnings on certain websites or applications. As before, these warnings/notifications may discourage the use of location services by the user completely.

Thus, this technical issue presents a problem of recognizing when a device is moved, and if the device is moved, is it on a regular basis. An embodiment addresses this problem by periodically logging certain characteristics (e.g., service set identifier (SSID), media access control (MAC) address, authentication type, system identification number (SID), etc.) of the device's wireless connection or available wireless signals. The logging of these characteristics allows a device to determine if the user switches to a different wireless network on a regular basis. If it is determined that the device does encounter a varied set of wireless signals, then it can be inferred that the device visits multiple different physical locations and thus is mobile. This inference is based upon the assumption that users that stay in one location typically stay on a single wireless network.

Accordingly, an embodiment provides a method of periodically receiving at least one characteristic associated with a detectable wireless signal. Once the characteristic or characteristics are determined, they are compared against a database containing a list of characteristics from previously known wireless signals. If the wireless signal is determined to be the same wireless signal (e.g., a user's home wireless broadcast) then no action is taken. However, if it is determined that unknown wireless signals are available to the device an inference is made about the device's mobility and a prompt is given to the user (e.g., a notification is displayed or delivered audibly). The prompt informs the user about the determination that their current device is a mobile device, and offers them the ability to enable further location detection services. After the user makes a selection, the device takes an action (e.g., turning off more detailed location tracking or turning on more detailed location tracking) based on that selection.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera. System 100 often includes a touch screen 170 for data input and display/rendering. System 100 also typically includes various memory devices, for example flash memory 180 and SDRAM 190.

Figure 2:
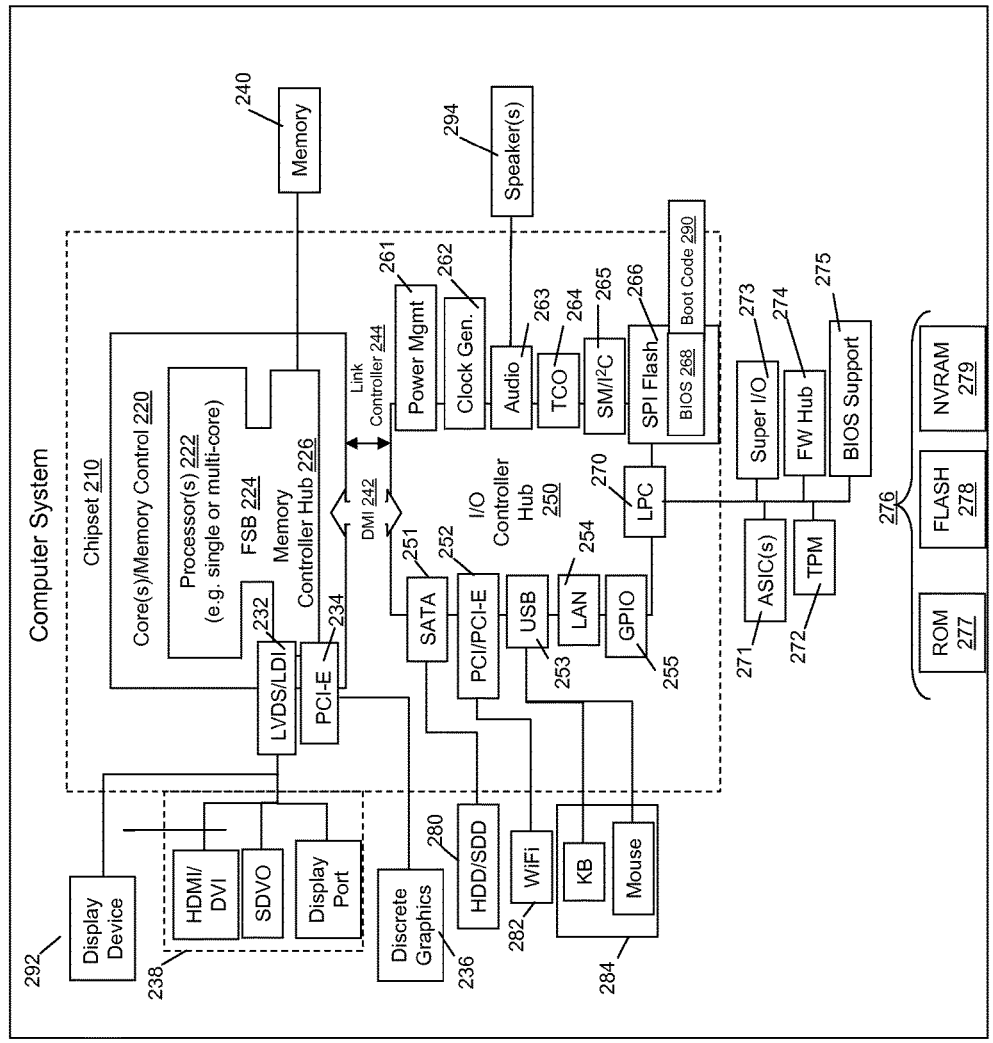
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which users may carry with them throughout the day and may require location based services. For example, the circuitry outlined in FIG. 1 may be implemented in a tablet or smart phone embodiment, whereas the circuitry outlined in FIG. 2 may be implemented in a personal computer embodiment.

Figure 3:
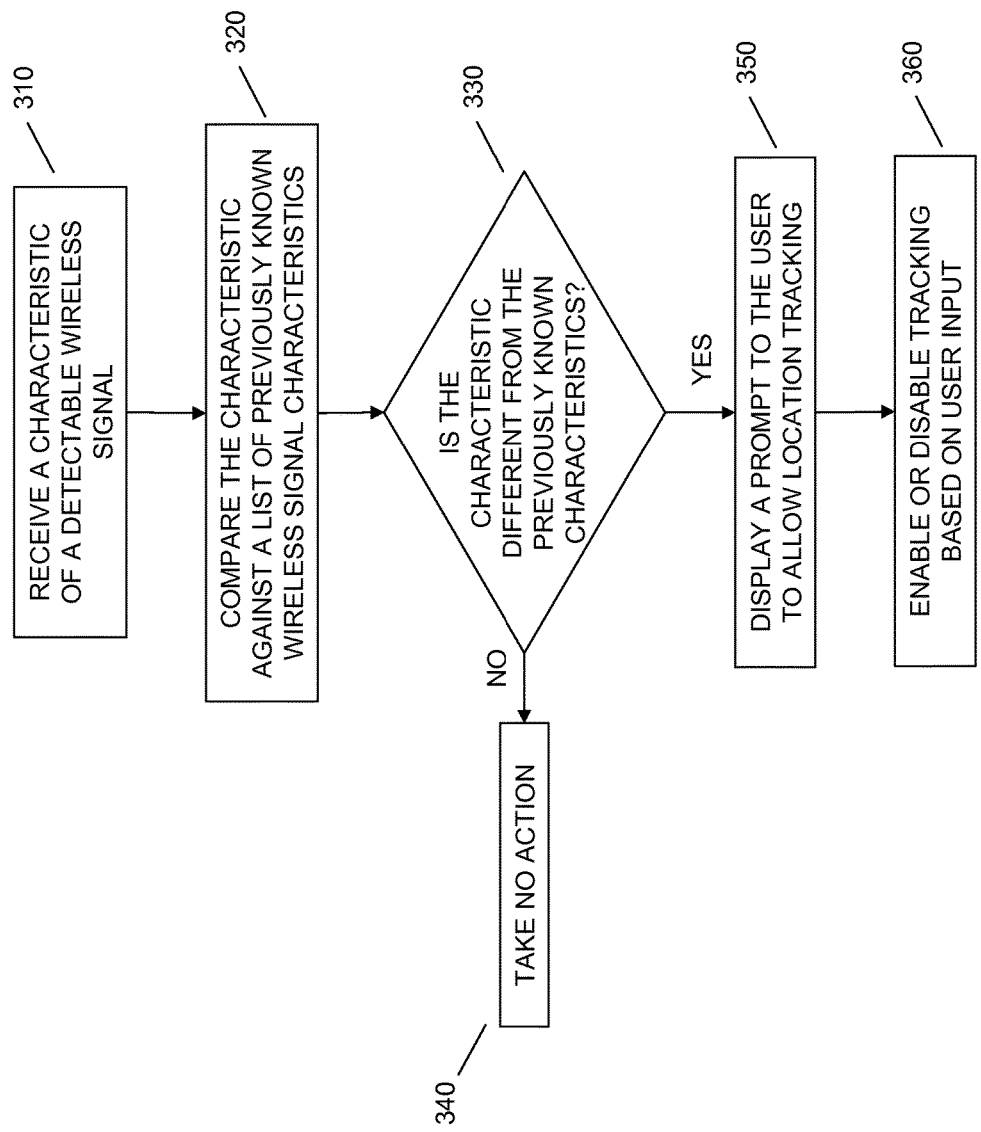
FIG. 3 illustrates an example method of determining if a user should be prompted to toggle device tracking.

Referring now to FIG. 3, an embodiment receives at least one characteristic of a wireless signal(s) at 310. The wireless signal could be any type of wireless signal (e.g., Wi-Fi, Bluetooth, cellular, etc.). An embodiment may or may not directly connect to a wireless network to receive the characteristic. The characteristic may comprise the SSID or SID of the wireless signal, the MAC address of a wireless access point, whether or not the wireless signal is encrypted or open, if encrypted, the type of encryption, the physical location of the access point, and any other information that is broadcast or ascertainable.

Once the characteristic(s) are received at 310, they are stored on a non-volatile storage medium (e.g., flash memory, hard disks, etc.). The storage of the characteristic(s) allows for the previously encountered wireless signal characteristic(s) to be stored for use in future comparisons discussed herein. In an embodiment, the storage medium is located on the local device itself (e.g., the hard disk of the user's laptop). Alternatively, an embodiment could record the characteristic(s) in a cloud service account associated with the user's device.

Once a record of previously encountered wireless signals has been established, in an embodiment, a device may periodically scan for any detectable wireless signals at 310. The newly acquired data regarding detectable wireless signals and their associated characteristics is then compared against the characteristics of the previously recorded wireless signals at 320. This process of evaluating and comparing wireless signal characteristics can, as with the storage, be done both at the local device and in a cloud service. Thus, the storage and processing can both be performed locally, both be performed by a cloud service, or any combination of the two.

Once the comparing is complete, a determination is made regarding whether the newly received characteristic(s) are different from the previously known characteristic(s) at 330. If it is determined that the newly received characteristic(s) match the previously recorded characteristics, it can be inferred that the device has not been transferred from one location to another. Thus, due to the stationary aspect of the device it is determined to be non-mobile in nature and no action is taken at 340. This allows for a less intrusive experience for the user. For example, the user will not repeatedly be asked to turn on their location services, as they would not be as beneficial to such a stationary device.

In an alternative embodiment, the comparison may determine that the newly received characteristic(s) are different form the previously known characteristics at 330. In order to achieve the highest reliability, multiple wireless signals with multiple characteristics can be received, recorded, and compared at 320. Thus, the determination at 330 may be based on a singular wireless signal and a singular characteristic or a plurality of both of them.

Once the determination is made that the newly received characteristic(s) are different from the previously known characteristic(s), an embodiment may display a prompt to the user at 350. The prompt at 350 may be displayed on a display device (e.g., a touch screen such as 170), or delivered audibly (e.g., through a speaker such as 294). In a further embodiment, the prompt may notify the user that a determination has been made regarding the mobile usage of their current device. An embodiment, through the prompt at 350, may then offer the user the option to enable further device location capabilities (e.g., GPS, Glonass, Galileo, multilateration of radio signals between cellular towers, etc.). Additionally, the option to enable location based services may be presented to the user with multiple timing or conditional options (e.g., permanently enabling, enabling for a singular application, enabling for certain duration of time, etc.).

Once the user has made their determination regarding the prompt at 350, an embodiment takes an action based on the user input at 360. In an embodiment, this action could involve turning on all location based services or a portion of those services for various durations of time and function as discussed.

Accordingly, as illustrated by the example embodiments and figures, an embodiment provides receiving, at a device (e.g., user's local device or a cloud based service) at least one characteristic of a detectable wireless signal(s) within proximity to the user device. For example, a user's home or work Wi-Fi signal. Specific characteristics regarding the available wireless signal are used in a comparison search against a database of previously encountered and recorded wireless signals and their respective characteristics. Based on that comparison, it is determined if the device is in a new location relative to previously known locations.

The various embodiments described herein thus represent a technical improvement to the process of requesting permission to track a user's location through their device. Thus offering a improvement to the current systems which are limited to: (1) being overly intrusive and constantly requesting that the user allow location tracking, even with the device is primarily used as a stationary device, or (2) never requesting to activate location based services, thus reducing the potential overall experience of a user's device.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    obtaining, at a mobile device, at least one characteristic of a detectable wireless signal at a location;
    comparing, using a processor of the mobile device, the at least one characteristic to a previously obtained wireless signal characteristic at a previous location;
    responsive to the at least one characteristic being different than a previously obtained wireless signal characteristic, providing, on the mobile device, a notification requesting a user to enable a location tracking service; and
    responsive to the at least one characteristic not being different to a previously obtained wireless characteristic, omitting the notification.

2. The method of claim 1, wherein the comparing further comprises: comparing the at least one characteristic to a list of previously received wireless signal characteristics; and
    determining based on the comparison that the at least one characteristic and at least one of the previously received wireless signal characteristics are different.

3. The method of claim 1, further comprising:
    receiving, at a device, a user input; and
    changing location tracking based on the user input.

4. The method of claim 1, wherein the previously received wireless signal characteristic is stored on the mobile device.

5. The method of claim 1, wherein the previously received wireless signal characteristic is stored on a cloud server.

6. The method of claim 1, wherein the at least one characteristic is an authentication type characteristic.

7. The method of claim 1, wherein the at least one characteristic is a media access control address of the wireless signal.

8. The method of claim 1, wherein the at least one characteristic is at least one of: a service set identification of the wireless signal or a system identification number of the wireless signal.

9. The method of claim 1, wherein the wireless signal is a short range wireless signal.

10. The method of claim 1, wherein the comparing comprises a comparison selected from the group consisting of an exact comparison, a relative comparison, a metadata comparison, and a threshold comparison.

11. An information handling device, comprising:
    a processor;
    a memory device that stores instructions executable by the processor to:
    obtain at least one characteristic of a detectable wireless signal at a location;
    compare the at least one characteristic to a previously obtained wireless signal characteristic at a previous location;
    provide, responsive to the at least one characteristic being different than a previously obtained wireless signal characteristic, a notification requesting a user to enable a location tracking service; and
    omit, responsive to the at least one characteristic not being different to a previously obtained wireless characteristic, the notification.

12. The information handling device of claim 11, wherein the comparing further comprises: comparing the at least one characteristic to a list of previously received wireless signal characteristics; and
    determining based on the comparison that the at least one characteristic and at least one of the previously received wireless signal characteristics are different.

13. The information handling device of claim 11, wherein the instructions are further executable by the processor to:
   receive, at a device, a user input; and
   toggle location tracking based on the user input.

14. The information handling device of claim 11, wherein the previously received wireless signal characteristic is stored on the information handling device.

15. The information handling device of claim 11, wherein the previously received wireless signal characteristic is stored on a cloud server.

16. The information handling device of claim 11, wherein the at least one characteristic is an authentication type characteristic.

17. The information handling device of claim 11, wherein the at least one characteristic is a media access control address of the wireless signal.

18. The information handling device of claim 11, wherein the at least one characteristic is at least one of: a service set identification of the wireless signal or a system identification number of the wireless signal.

19. The information handling device of claim 11, wherein the comparing comprises a comparison selected from the group consisting of an exact comparison, a relative comparison, a metadata comparison, and a threshold comparison.

20. A product, comprising:
   a storage device having code stored therewith, the code being executable by a processor and comprising:
   code that obtains at least one characteristic of an available wireless signal at a location;
   code that compares the at least one characteristic to a previously obtained wireless signal characteristic at a previous location;
   code that provides, responsive to the at least one characteristic being different than a previously obtained wireless signal characteristic, a notification requesting a user to enable a location tracking service; and
   code that omits, responsive to the at least one characteristic not being different to a previously obtained wireless characteristic, the notification.

* * * * *